(12) United States Patent
Smith

(10) Patent No.: US 8,726,364 B2
(45) Date of Patent: May 13, 2014

(54) AUTHENTICATION AND ACCESS PROTECTION OF COMPUTER BOOT MODULES IN RUN-TIME ENVIRONMENTS

(75) Inventor: Ned Smith, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 1105 days.

(21) Appl. No.: 12/165,639

(22) Filed: Jun. 30, 2008

(65) Prior Publication Data

US 2009/0328195 A1    Dec. 31, 2009

(51) Int. Cl.
*G06F 12/00* (2006.01)
*G06F 21/57* (2013.01)

(52) U.S. Cl.
CPC .................. *G06F 21/575* (2013.01)
USPC ............................ 726/16; 711/163

(58) Field of Classification Search
CPC ....... G06F 21/10; G06F 21/12; G06F 21/121; G06F 21/125; G06F 21/126; G06F 21/31; G06F 21/50; G06F 21/51; G06F 21/52; G06F 21/57; G06F 21/575; G06F 21/83
USPC ............. 726/16, 2, 26, 27; 719/321; 712/220; 711/152, 154, 163
See application file for complete search history.

(56) References Cited

U.S. PATENT DOCUMENTS

| | | | | |
|---|---|---|---|---|
| 5,371,871 A * | 12/1994 | Spilo | ............................... | 711/154 |
| 5,426,775 A * | 6/1995 | Boccon-Gibod | ............... | 714/36 |
| 5,537,597 A * | 7/1996 | Sandage | ......................... | 717/162 |
| 5,809,230 A * | 9/1998 | Pereira | .............................. | 726/35 |
| 6,009,540 A * | 12/1999 | Craft et al. | ....................... | 714/30 |
| 6,195,749 B1 * | 2/2001 | Gulick | ................................ | 713/1 |
| 6,763,458 B1 * | 7/2004 | Watanabe et al. | .............. | 713/100 |
| 7,127,579 B2 * | 10/2006 | Zimmer et al. | ................. | 711/163 |
| 7,254,720 B1 * | 8/2007 | Giles et al. | ........................ | 726/26 |
| 7,305,534 B2 * | 12/2007 | Watt et al. | ........................ | 711/163 |
| 2004/0041029 A1 * | 3/2004 | Postman et al. | ............ | 235/462.3 |
| 2005/0060568 A1 * | 3/2005 | Beresnevichiene et al. | .. | 713/200 |
| 2006/0224878 A1 | 10/2006 | Datta et al. | | |
| 2006/0242280 A1 * | 10/2006 | Zimmer et al. | ................ | 709/222 |
| 2006/0288202 A1 * | 12/2006 | Doran et al. | ........................ | 713/2 |
| 2007/0055856 A1 * | 3/2007 | Zimmer et al. | .................... | 713/2 |
| 2007/0106986 A1 * | 5/2007 | Worley, Jr. | ......................... | 718/1 |
| 2007/0168676 A1 * | 7/2007 | Fayad et al. | .................... | 713/185 |
| 2008/0022108 A1 * | 1/2008 | Brannock et al. | .............. | 713/176 |
| 2008/0071953 A1 * | 3/2008 | Kershaw et al. | .............. | 710/110 |
| 2009/0063799 A1 * | 3/2009 | Berenbaum et al. | ........... | 711/163 |

OTHER PUBLICATIONS

Zimmer, Vincent "Introducing the Intel Platform Innovation Framework for the Extensible Firmware Interface" [Online], Feb. 3, 2004 [Retrieved on Mar. 11, 2011], Technology@Intel Magazine [Retrieved from: http://www.deviceforge.com/articles/AT8747644820.html].*

* cited by examiner

*Primary Examiner* — Tae Kim
*Assistant Examiner* — Eric W Shepperd
(74) *Attorney, Agent, or Firm* — Garrett IP, LLC

(57) ABSTRACT

Methods and systems to authenticate and load a plurality of boot logic modules in corresponding access protected memory regions of memory, and to maintain the access protections in run-time environments. Access protection may be implemented with access control list (ACL) policies expressed in terms of page boundaries to distinguish between read, write, and execute access requests.

24 Claims, 6 Drawing Sheets

AUTHENTICATION AND ACCESS PROTECTION OF COMPUTER BOOT MODULES IN RUN-TIME ENVIRONMENTS

BACKGROUND

Root-kits and spyware may be designed to avoid detection by security software executing in on a computer processor platform, to observe user activity, capture user data, perform circumvention of user actions, and other malicious activities.

Trusted platform modules (TPMs) may be used to authenticate an application or service and protect the application or service when executing from memory. TPMs may be implemented in accordance with a Trusted Computing Group Trusted Platform Module (TCG TPM) Specification, Version 1.2, published in October, 2003.

Modular boot logic, such as extensible firmware interface (EFI) boot modules, may be susceptible to malware in an operating environment. For example, EFI drivers and service applications may persist after transition to run-time environments, and operating system applications may call into pre-boot software. In addition, with EFI, entry points into code may be dynamically instantiated, and proprietary interfaces may exist. Malware in a host environment, and potential incompatibilities between third party drivers, may thus impact pre-boot software.

BRIEF DESCRIPTION OF THE DRAWINGS/FIGURES

Figure 1:
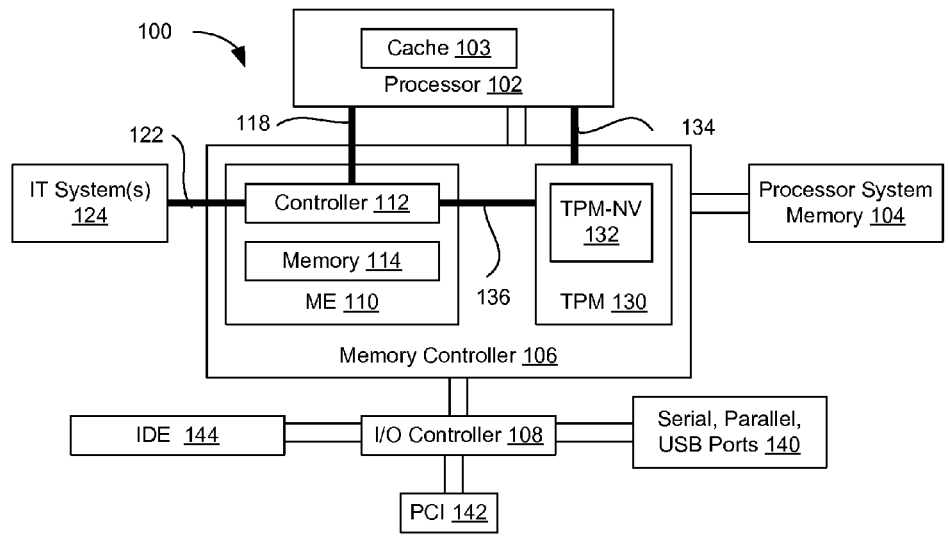
FIG. 1 is a block diagram of an exemplary computer processor environment.

In the drawings, the leftmost digit(s) of a reference number identifies the drawing in which the reference number first appears.

DETAILED DESCRIPTION

Disclosed herein are methods and systems to authenticate and load a plurality of boot logic modules in corresponding access protected memory regions of memory, and to maintain the access protections in run-time environments.

Access protection may be implemented with access control list (ACL) policies expressed in terms of page boundaries to distinguish between read, write, and execute access requests. Protected regions of memory may contain executable code and/or initialization data. In a run-time environment, ACL policy may be configured to prevent writing to executable code and/or initialization data, and may be configured to permit one or more of execute-only, execute-read, or read-only access.

Integrity checks performed on memory pages when loaded authenticates the code or logic, and no-write policies protect runtime integrity.

FIG. 1 is a block diagram of an exemplary computer processor environment 100, including one or more computer instruction processing units, illustrated here as processor 102, to execute computer program product logic, also referred to herein as instructions, logic, and software. Processor 102 may include cache memory 103 to store frequently accessed data and/or instructions.

Computer processor environment 100 includes system memory 104, which includes a computer readable medium to store computer readable instructions to cause processor 102 to perform one or more functions in response thereto. Exemplary instructions are described below with reference to FIG. 2.

Computer processor environment 100 includes a memory controller 106 to interface between memory 104 and other devices. Memory controller 106 may include a graphics controller and may include direct memory access (DMA) translation hardware.

Computer processor environment 100 includes an input/output (I/O) controller 108 to interface between computer processor environment 100 and one or more I/O devices through one or more of serial, parallel, and USB ports 140, peripheral component interface (PCI) 142, and integrated drive electronics (IDE) interface 144.

Computer processor environment 100 may include a management system or management engine (ME) 110 to perform one or more management functions with respect to computer processor environment 100. ME 110 may include an instruction processor, illustrated here as a controller 112, which may be a microcontroller, and memory 114 having a computer readable medium to store computer readable instructions to cause controller 112 to perform one or more functions in response thereto. Exemplary instructions are described further below. Memory 114 may include firmware, which may include non-volatile random access memory (NVRAM) that is secure from operating environments of processor 102.

Computer processor environment 100 may include a communication link 118 between controller 112 and processor 102. Link 118 may be configured to permit controller 112 and processor 102 to communicate in a secure mode of processor 102, outside of an operating environment of processor 102, such as during a system management mode of processor 102.

Computer processor environment 100 may include a communication link 122 between controller 112 and one or more information technology (IT) systems 124. IT systems 124 may include one or more of a network administrator, a back-end server, and other infrastructure devices. Controller 112 may be configured to send reports or alerts over link 122, and may be configured to receive information over link 122, which may include one or more of instructions, updates, and memory access control list policies, as described further below.

Link 122 may be isolated or secure from processor 102 and operating environment of processor 102, such that link 122 is not interruptible by malware running on processor 102. Such a communication link is referred to herein as an out-of-band (OOB) communication link.

ME 110 may be configured to store alerts when communication link 122 is disabled, and report the stored alerts when connectivity is restored. One or more IT systems 124 may be physically and/or geographically remote with respect to other portions of computer processor environment 100.

Computer processor environment 100 may include a trusted platform module (TPM) 130, which may include authentication measurements, signatures, or values, and instruction logic to cause processor 102 to authenticate instruction or logic modules with reference to the authentication values. Authentication may include comparing a hash of a logic module to an authentication value. TPM 130 may include secure memory, such as non-volatile random access memory, illustrated here as TPM-NV 132, to store the authentication values and/or logic. The authentication values may be hash values, which may be cryptographic hash values.

One or more integrity verification processes may include obtaining integrity check values from, or under control of TPM 130. TPM-NV 132 may contain a hash of a manifest of integrity check values, or a hash of a signing key that signs a manifest that contains integrity check values. Where a manifest list is used, TPM-NV 132 may contain a counter nonce that prevents replay and/or replacement attacks on the manifest list.

TPM 130 may include platform configuration registers (PCRs) to store hash values. TPM 130 may be configured to prevent writing to the PCRs from external devices, such as processor 102. TPM 130 may be configured to permit external devices, such as processor 102, to extend PCR contents, wherein a current value in a PCR is appended with a new value, and a hash is performed on the combined value. The hash result is used a new PCR value. Such hashes may be order dependent to permit PCR contents to indicate the order of measurement appendages. TPM 130 may be implemented in accordance with a Trusted Computing Group Trusted Platform Module (TCG TPM) Specification, Version 1.2, published in October, 2003.

Processor 102 may be configured to access TPM 130 over a link 134 in a secure mode of processor 102, outside of an operating environment of processor 102.

ME controller 112 may be configured to communicate with TPM 130 over a link 136 to provision authentication values and/or logic updates.

Isolation, security, and access privileges described herein may be implemented with hardware, software, firmware, and combinations thereof.

Computer processor environment 100, or portions thereof, may be implemented on a common integrated circuit (IC) chip or over multiple IC chips mounted on a common circuit board or over multiple circuit boards.

Figure 2:
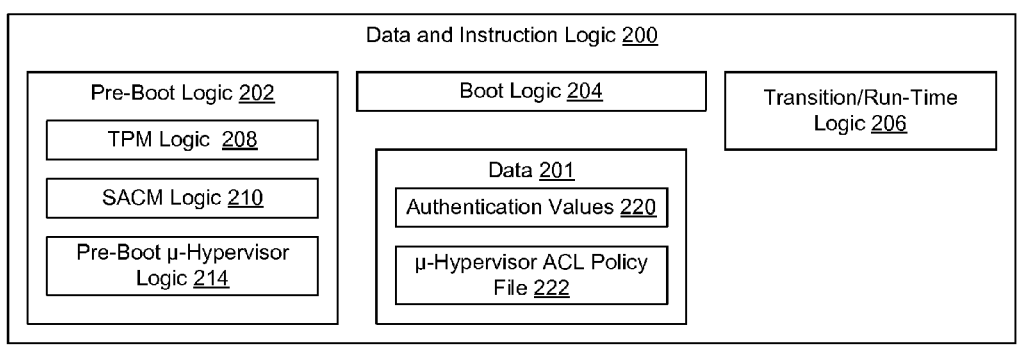
FIG. 2 is a block diagram of exemplary data and computer instructions corresponding to FIG. 1.

FIG. 2 is a block diagram of exemplary data and computer instruction logic 200, to control one or more of processor 102 and ME controller 112.

Data and instruction logic 200 includes:
pre-boot logic 202 to cause processor 102 to initialize computer processor environment 100 upon a system reset or power-on;
boot logic 204 to cause processor 102 to install drivers, transient applications, and to prepare to load operating environment logic;
transition/run-time logic 206 to cause processor 102 to host an operating environment, or to host a virtualized environment for a plurality of operating environments; and
data 201.

Pre-boot logic 202 includes pre-boot μ-hypervisor logic 214, also referred to herein as μ-hypervisor logic 214, to cause processor 102 to configure access protected regions of memory, or μ-contexts, for each of a plurality of executable boot logic modules, including one or more terminate and stay resident (TSR) logic modules that are callable from an operating environment. The μ-contexts are configured prior initiating corresponding ones of the plurality of executable boot logic modules. Pre-boot hypervisor logic 214 includes logic to cause processor 102 to maintain the page-based protected regions of memory, for at least the TSR logic, in the operating environment.

Pre-boot μ-hypervisor logic 214 may reference one or more access control list (ACL) policies, which may be maintained as an ACL policy file, illustrated in FIG. 1 as a μ-hypervisor ACL policy file 222. ACL policies may be expressed in terms of page boundaries to cause processor 102 to distinguish between read, write, and execute access requests.

ACL policy file 222 may be stored in a persistent, secure location, such as TPM-NV 132. Alternatively, a hash of ACL policy 222 file may be stored in TPM-NV 132, and ACL policy file 222 may be stored on disk or in flash memory.

ACL policies may be provisioned and managed by ME 110, using OOB link 122 to IT systems 124, link 136 to TPM 130, and/or a link 118 to processor 102.

Pre-boot logic 202, or portions thereof, such as pre-boot μ-hypervisor logic 214, may be authenticated prior to initiation in accordance with TPM 130. Pre-boot logic 200 may include TPM logic 208 to cause processor 102 to authenticate pre-boot μ-hypervisor logic 214 with respect corresponding authentication values 220 in FIG. 2. ACL policy file 222 may be authenticated upon initiation of μ-hypervisor logic 214, and loaded into memory pages that are only accessible by and under control of pre-boot μ-hypervisor logic 214.

One or more of the boot logic modules within boot logic 204 may include logic to cause processor 102 to locate, authenticate, load, and initiate a subsequent boot logic module. Pre-boot logic 202 may include logic to locate, authenticate, load, and initiate an initial boot logic module within boot logic 204.

A logic module may be authenticated in a persistent storage location, and then loaded and initiated. Alternatively, a logic module may be loaded and then authenticated prior to initiation. Where a logic module is authenticated in accordance with TPM 130, the logic module may be authenticated and/or initiated in memory accessible to and access protected by TPM 130, such as cache 103 or memory 104.

Upon an authentication error or exception, processor 102 may invoke ME 110. ME 110 may be configured to re-provision a logic module and/or corresponding authentication reference value(s), and to force processor 102 to reattempt authentication, with or without a system reset. ME 110 may be configured to evaluate an exception to determine whether the logic module and/or the reference values are correct. ME 110 may be configured to notify IT system 124 of an exception over OOB link 122, and may be configured to receive a replacement logic module and/or authentication reference value(s) over link 122.

Figure 3:
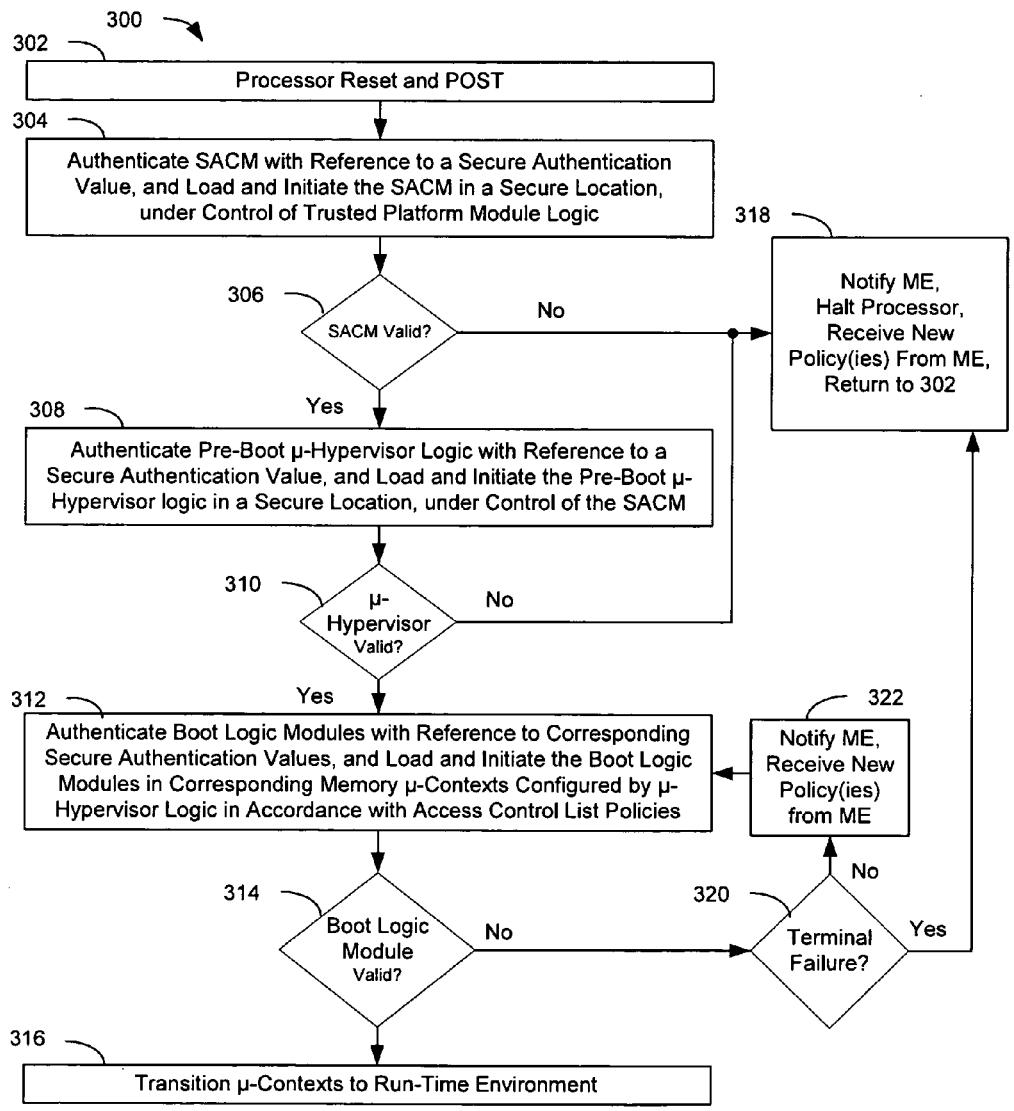
FIG. 3 is a process flowchart of an exemplary method of authenticating, loading, and initializing a plurality of boot logic modules in corresponding page-based access protected regions of memory, and of transitioning the protections to a run-time environment.

Boot logic 204 may include dynamically loadable and callable boot logic modules. FIG. 3 is a process flowchart of an exemplary method 300 of authenticating, loading, and initializing a plurality of such boot logic modules, in corresponding page-based access protected regions of memory. Method 300 is described below with reference to FIGS. 1 and 2 for illustrative purposes. Method 300 is not, however, limited to the examples of FIGS. 1 and 2.

At 302, processor 102 is reset or powered up. Upon the reset, processor 102 may initiate a power on self test (POST).

At 304, a start-up authenticated code module (SACM) 210 is authenticated with reference to a secure authentication value, and loaded and initiated in a secure location, under control of TPM logic 208. SACM 210 is loadable code that runs on processor 102 in a protected execution environment, or authenticated code execution mode, established by TPM logic 208.

TPM logic 208 may include logic to cause processor 102 to load SACM 210 in a TPM protected and TPM addressable memory space, which may include cache 103. TPM logic 208 may include logic to cause processor 102 to use protected memory space as system memory during the pre-boot phase, or a portion thereof.

Alternatively, processor 102 may include microcode to cause processor 102 to read TPM-NV 132 independent of other conventional TPM features.

TPM logic 208 may include a memory cleanup module to initialize cache 103 and/or memory 104. Alternatively, since the processor system has been recently reset or powered up, memory cleanup may be omitted.

TPM logic 208 may include logic to cause processor 102 to authenticate SACM logic 210 in its original persistent storage location and then load and initiate SACM logic 210 in cache 103. Alternatively, TPM logic 208 may include logic to cause processor 102 to load, authenticate, and initiate the SACM in cache 103.

TPM logic 208 may include logic to cause processor 102 to authenticate SACM logic 210 with respect to one or more authentication reference values maintained in a secure location, such as TPM-NV 132 or other memory controlled by ME 110. Authentication may include comparing a hash of the SACM to an authentication value or signature.

At 308, pre-boot μ-hypervisor logic 214 is authenticated with reference to a secure authentication value, and loaded and initiated in a secure location, under control of SACM 208.

Authentication may be performed with respect to an authentication value stored in read-only memory, such as TPM-NV 132 or other secure memory controlled by ME 110. Authentication may include an authentication value contained in a white list protected by secure storage, such as TPM-NV 132.

SACM 210 may verify ACL policy file 222 as part of launching pre-boot μ-hypervisor logic 214. Once verified, ACL policy file 222 may be placed in protected memory pages that may be accessible only under control of pre-boot μ-hypervisor logic 214.

Pre-boot μ-hypervisor logic 214, or portions thereof, may be loaded and initiated in cache 103 and/or memory 104. Where μ-hypervisor logic 214, or a portion thereof, is initiated from cache 103, the logic may be transitioned to memory 104 at a later time.

At 312, boot logic modules within boot logic 204 are authenticated with reference to corresponding secure authentication values, and loaded and initiated in corresponding memory μ-contexts configured by pre-boot μ-hypervisor logic 214 according to ACL policy file 222.

The boot logic modules may be authenticated, loaded, and initiated in a serial, or semi-serial fashion, and one or more of the boot logic modules may include logic to cause processor 102 to authenticate, load, and initiate a subsequent boot logic module. A pre-boot logic module may include logic to authenticate, load, and initiate an initial boot logic module.

During this phase of the boot process, memory access requests are trapped into μ-hypervisor logic 214 to cause processor 102 to control memory access in accordance with ACL policy file 222. Unauthorized access requests may cause processor 102 to invoke ME 110 for potential remedial action, which may avoid a boot failure.

At 316, the μ-contexts are transitioned to a run-time environment, which may be a non-virtualized operating environment or a virtualized environment.

Upon an authentication error, at 306 with respect to SACM 210, or at 310 with respect to pre-boot μ-hypervisor logic 214, processing proceeds to 318. At 318, ME 110 may be called to provision one or more new policies and/or images, the boot process may be halted, and processing may return to 302 for reset using one or more new policies and/or images from ME 110.

Upon an authentication error at 314, where the error is not terminal at 320, such as a driver module or transient application, processing may proceed to 322. At 322, ME 110 may be called to provision one or more new policies and/or images, and processing may return to 312 to retry authentication of the module. Otherwise, processing may proceed to 318, as described above.

Boot logic modules within boot logic 204 may include extensible firmware interface (EFI) boot logic modules. EFI is a specification that defines a software interface between an operating system and platform firmware, developed by Intel Corporation and managed by the Unified EFI Forum (UEFI).

Figure 4:
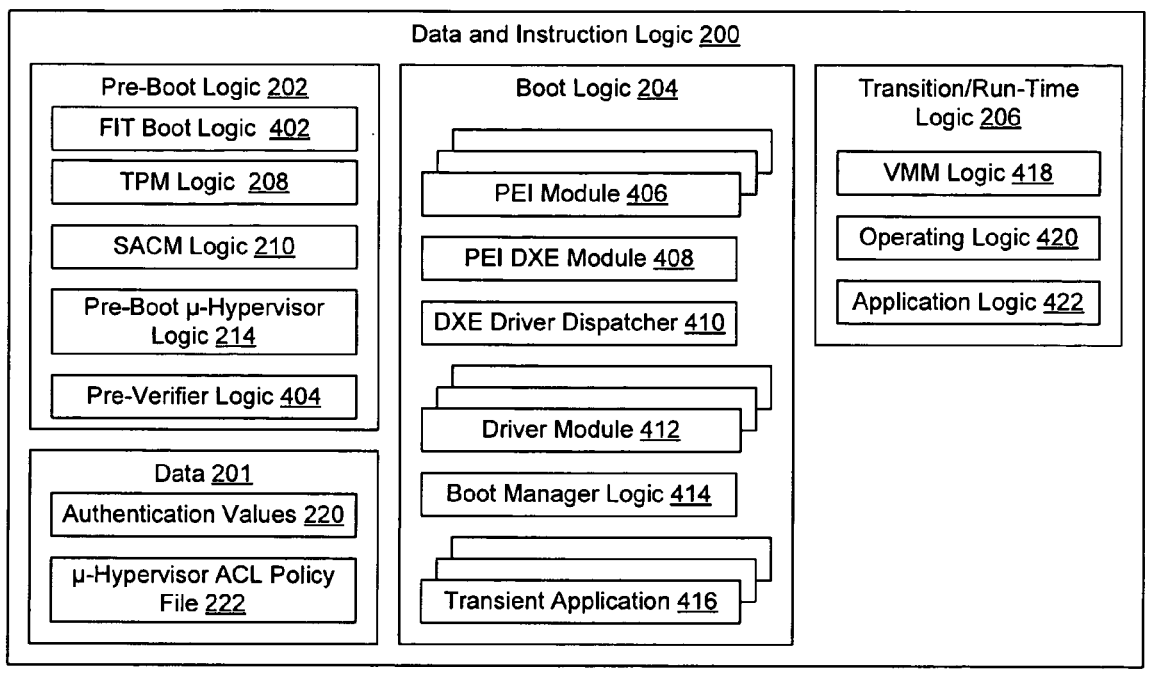
FIG. 4 is a block diagram of the exemplary data and computer instructions of FIG. 2, further including extensible firmware interface (EFI) logic modules.

FIG. 4 is a block diagram of exemplary data and computer instruction logic 200, wherein pre-boot logic 202 includes firmware interface table (FIT) boot logic 402 and pre-verifier logic 404, and boot logic 204 includes:

one or more pre-EFI (PEI) modules 406, which may include a PEI pre-driver execution environment (PEI DXE) module 408;

a DXE driver dispatcher module 410;

one or more driver modules 412, which may include one or more terminate and stay resident (TSR) applications that may be callable from a run-time environment;

a boot manager logic module 414; and one or more transient applications 416, which may be callable from a run-time environment.

Functions and operation of the conventional logic modules are well known. Additional features and logic of logic modules 406-416 are disclosed below.

Figure 5A:
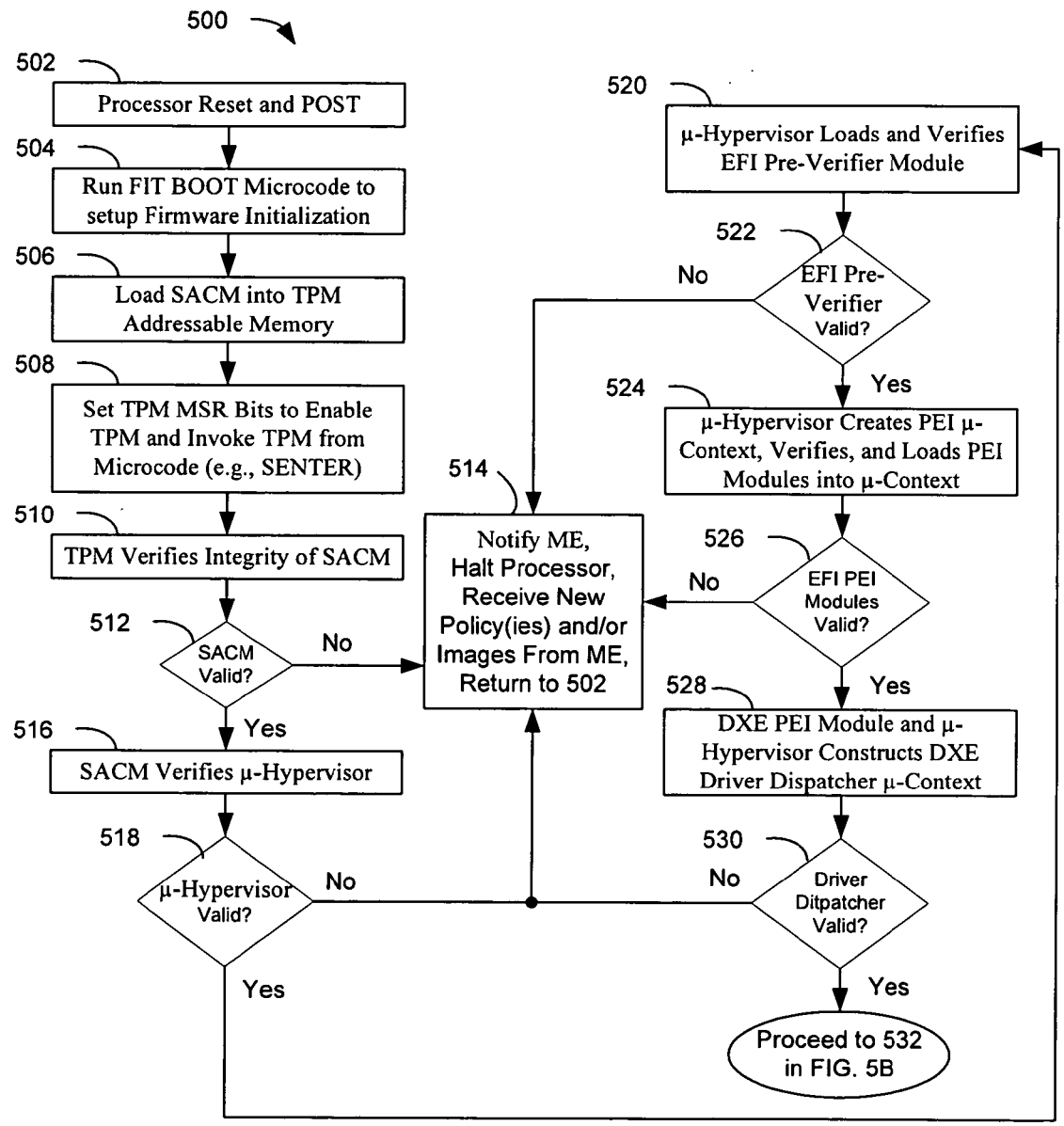
FIGS. 5A and 5B illustrate a process flowchart of an exemplary method of authenticating and loading the EFI logic modules illustrated in FIG. 4.
Figure 5B:
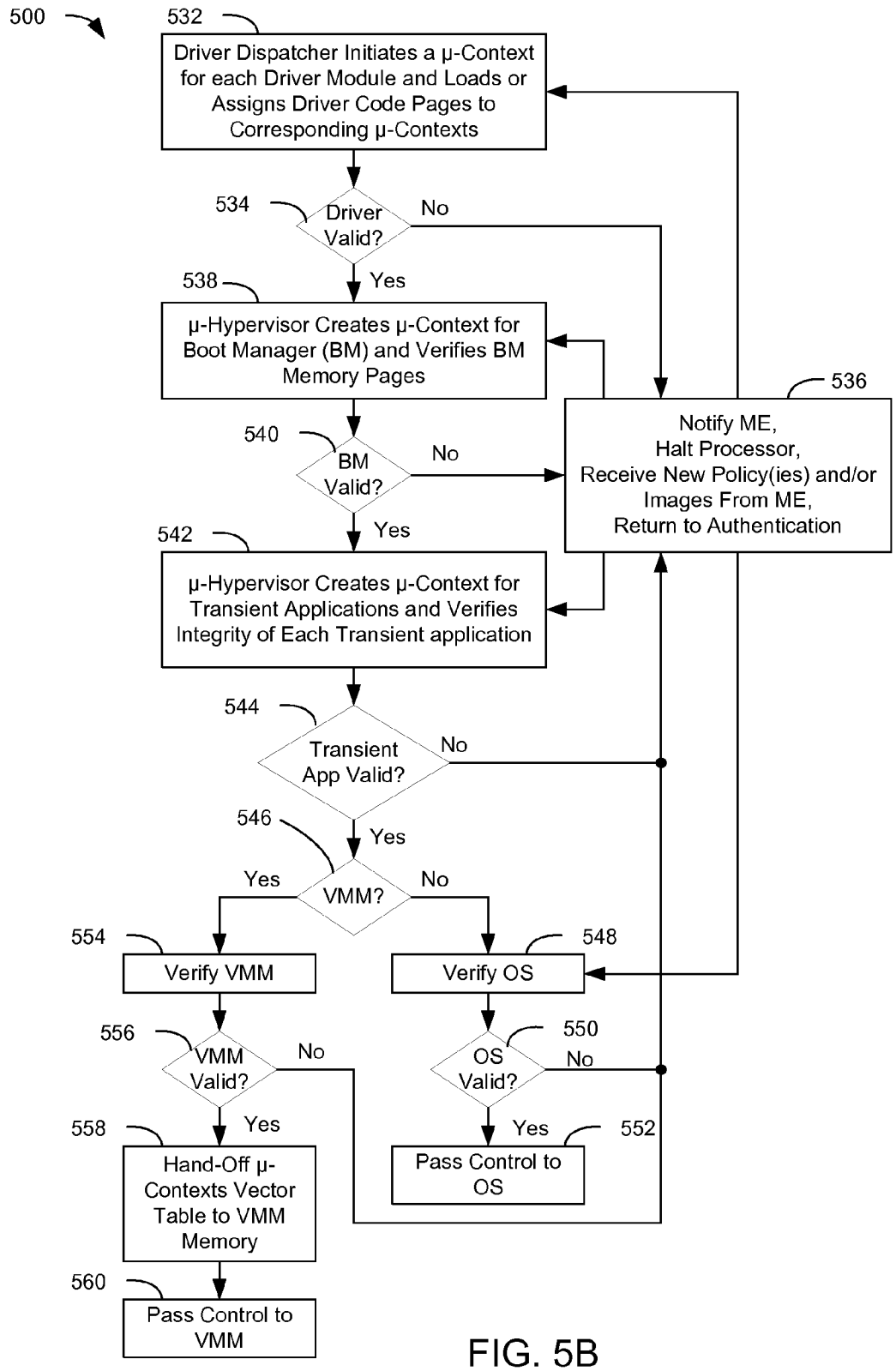

FIGS. 5A and 5B illustrate a process flowchart of an exemplary method 500 of authenticating and loading logic modules illustrated in FIG. 4.

Figure 6:
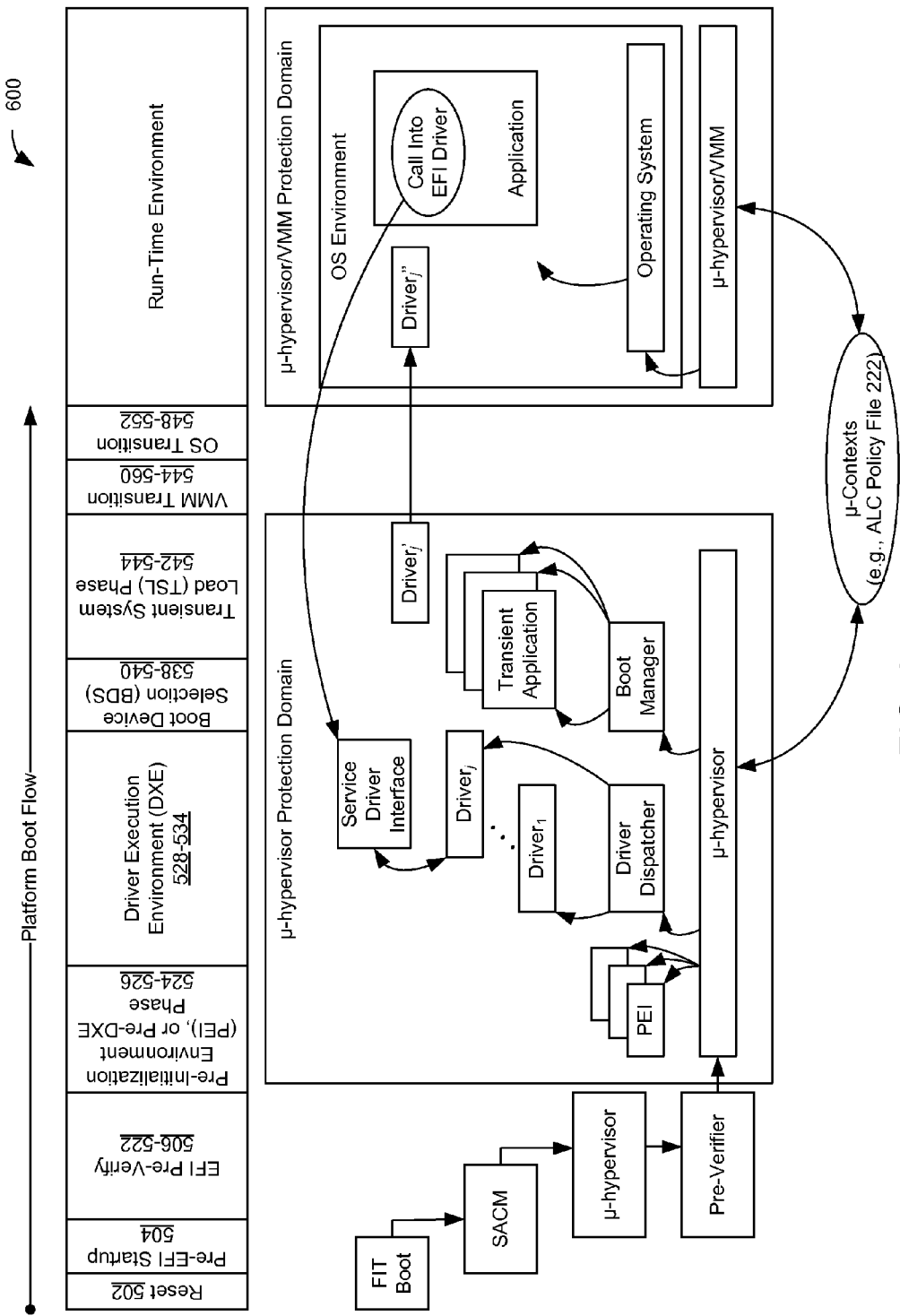
FIG. 6 is graphical illustration of an exemplary platform boot flow sequence corresponding to FIGS. 4, 5A, and 5B.

FIG. 6 is graphical illustration of an exemplary platform boot flow sequence 600 and example logic modules, which may correspond to one or more logic modules illustrated in FIG. 4.

In FIG. 5A, at 502, a computer processor system is reset or powered-up. Upon the reset, the processor may initiate a power on self-test (POST).

At 504, the processor may invoke or initiate FIT boot logic 402, which may include microcode, to setup a firmware initialization vector.

At 506, SACM 210 is loaded into TPM addressable memory, substantially as described above with respect to 304 in FIG. 3. Additionally, FIT boot logic 402 may include logic to cause processor 102 to verify an existence and integrity of SACM 210, and to initiate TPM logic 208 to authenticate and load SACM 210. Processor 102 may use TPM logic 208 to enter a secure mode of operation, or may boot directly in a TPM mode. For example, TPM logic 208 may be initiated with an instruction contained within FIT boot logic 402, or may be initiated in response to a FIT pointer to a memory location corresponding to TPM logic 208.

At 508, most significant bits (MSBs) corresponding to TPM 130 may be set to enable TPM 130 and to invoke TPM 130 from microcode. TPM 130 may be invoked, for example, with a secure mode enter (SENTER) command.

At 510, TPM 130 verifies an integrity of SACM 210, substantially as described above with respect to 304 in FIG. 3.

At 512, upon an authentication error, processing proceeds to 514 for ME processing, as described above with respect to 318 in FIG. 3.

At 516, pre-boot μ-hypervisor logic 214 is verified by SACM 210, substantially as described above with respect to 308 in FIG. 3.

At 518, upon an authentication error, processing proceeds to 514 for ME processing, as described above.

At 520, pre-verifier logic 404 is loaded and verified by pre-boot μ-hypervisor logic 214. Alternatively, pre-verifier logic 404 may be loaded and verified by SACM 210. Alternatively, pre-verifier logic 404 may include μ-hypervisor logic 214, in which case, authentication of pre-boot μ-hypervisor logic 214 is accomplished upon authentication of pre-verifier logic 404. Alternatively, μ-hypervisor logic 214 may be loaded and verified by pre-verifier logic 404. Pre-verifier logic 404 is also referred to herein as a pre-driver execution environment (pre-DXE) basic input/output system (BIOS) component.

At 522, upon an authentication error, processing proceeds to 514 for ME processing, as described above.

At 524, μ-hypervisor logic 214 creates one or more PEI μ-contexts. Pre-boot μ-hypervisor logic 214 or pre-verifier logic 404 may verify and load PEI modules 406 and 408 into the μ-context(s). Pre-verifier logic 404 or μ-hypervisor logic 214 may include logic to cause processor 102 to implement TPM 130, and may include logic to extend PCRs in TPM-NV 132, as described above. Pre-verifier logic 404 may invoke μ-hypervisor logic 214 to construct a separate μ-context memory container for each PEI logic module 404 and 406, or may construct a μ-context memory container for a plurality of PEI logic module 404 and 406.

At 526, upon an authentication error, processing proceeds to 514 for ME processing, as described above.

At 528, PEI DXE module 408 and μ-hypervisor logic 214 construct a DXE driver dispatcher μ-context for DXE driver dispatcher logic 410. PEI DXE module 408 may invoke μ-hypervisor logic 214 to construct the μ-context and may include logic to authenticate, load, and initiate DXE driver dispatcher logic 410 in the μ-context.

At 530, upon an authentication error, processing proceeds to 514 for ME processing, as described above.

In FIG. 5B, at 532, DXE driver dispatcher logic 410 initiates one or more μ-contexts for driver modules 412, which may include server drivers and device drivers. Driver modules 412 may be dynamically loaded and provisioned, and thus may be provided with corresponding separate μ-contexts by μ-hypervisor logic 214.

Driver modules 412 may be provided by different entities and thus may not be tested for potential incompatibilities with other drivers and operating environment applications. Drivers may also be susceptible to malicious code that may alter, copy, observe, or improperly use a driver module. Providing a separate μ-context memory container around each driver module 412 may help to protect driver modules 412 from unauthorized access and malicious or improper code.

A driver module vendor may specify driver-specific access control policy, which may be included as part of the driver image or which may be provisioned in secure storage (TPM-NV). IT access control policies may be specified and provisioned via secure storage via ME 110. DXE driver dispatcher logic 410 may load, or assign driver code pages to μ-contexts associated with appropriate driver modules 412, and may insert such driver-specific access control policies in ACL policy file 222.

Service and device drivers may include applications that may terminate and stay resident (TSR), which may be callable from within a post-boot run-time environment. Accordingly, ACL policies corresponding to TSR applications may be maintained throughout boot phase and into one or more subsequent run-time environments, as described below.

At 534, upon an authentication error, processing proceeds to 536 for ME processing. At 536, ME 110 is notified and one or more new policies and/or logic images may be received from ME 110. Processing returns to 532 to authenticate the failed driver module 412 with respect to the one or more new policies and/or logic images.

At 538, μ-hypervisor logic 214 creates a μ-context for boot manager logic 414 and verifies boot manager logic 414 memory pages. DXE driver dispatcher logic 410 may include logic to invoke μ-hypervisor logic 214 to construct a dedicated μ-context for boot manager logic 414. Alternatively, boot manager logic 414 may be loaded and initiated within the protected memory space of DXE driver dispatcher logic 410. DXE driver dispatcher logic 410 may include logic to authenticate boot manager logic 414 prior to loading boot manager logic 414 in the protected memory space of DXE driver dispatcher logic 410.

At 540, upon an authentication error, processing proceeds to 536 for ME processing as described above. Processing then returns to 538 to authenticate boot manager logic 414 with respect to one or more new policies and/or logic images.

At 542, boot manager logic 414 invokes μ-hypervisor logic 214 to create one or more μ-contexts for transient applications 416. As with drivers, transient applications pose potential threats to the boot phase environments and to other transient applications. Accordingly, μ-hypervisor logic 214 may creates a separate μ-context for each of a plurality of transient applications 416. As with driver modules 412, one or more of transient application modules 416 may include application-specific access control policies to restrict devices or services that may call into the corresponding application. IT may also provision ACL rules to protect against errant transient applications.

At 544, upon an authentication error, processing proceeds to 536 for ME processing as described above. Processing then returns to 542 to authenticate the failed transient application 416 with respect to one or more new policies and/or logic images.

Pre-boot μ-hypervisor ACL policies may be transitioned to a run-time environment, which may include a native, or non-virtualized operating environment, or a virtualized environment supporting one or more guest operating environments.

Boot manager logic 414 may selectively locate, authenticate, load, and initiate operating system logic 420 in a non-virtualized, or native operating environment, and may selectively locate, authenticate, load, and initiate virtual machine manager (VMM) logic 418 to provide or more guest operating environments. Alternatively, μ-hypervisor logic 214 may transition into a VMM. Boot manager logic 414 may select and configure a run-time environment in accordance with boot option configuration settings.

When a non-virtualized environment is selected at 546, processing proceeds to 548.

At 548, boot manager logic 414 verifies operating system logic 420. At 550, upon an authentication error, processing proceeds to 536 for ME processing as described above. Processing then returns to 548 to authenticate operating system logic 420 with respect to one or more new policies and/or logic images.

At 552, operating system logic 420 is initiated. Pre-boot μ-hypervisor logic 214 may permit boot manager logic 414 to launch the operating system image. The operating system may be provided with direct access to system hardware, while μ-hypervisor logic 214 continues to protect TSR drivers and transient applications when the operating environment calls back into the EFI environment.

When a virtualized environment is selected at 546, pre-boot μ-hypervisor logic 214 may function as, or transition into a post-boot VMM, wherein a virtual machine (VM) partition is constructed, boot manager logic 414 locates, authenticates, loads, and initiates an operating system image into the VM partition, and pre-boot μ-hypervisor logic 214 continues to maintain and enforce pre-boot memory μ-contexts or ACL policies for the VM.

Alternatively, another VMM may be initiated to maintain and enforce pre-boot memory μ-contexts or ACL policies for the VM. In this situation, at 554 and 556, boot manager logic 414 may locate, authenticate, load, and initiate a VMM loader, which may initiate VMM logic 418 in FIG. 4. Alternatively, the VMM loader may part of boot manager logic 414.

The VMM loader then vectors the VMM to an operating system image to be executed in a VM. Pre-boot memory μ-contexts or ACL policies are then migrated to the VMM. Migration may include sending a vector table of the μ-contexts to the VMM as part of the construction of the VMM at 558. The VMM looks for the vector table at initialization and inherits the pre-boot μ-contexts at 560. Attempts to access EFI drivers by post-boot applications 422 are access controlled by the VMM. The vector table contains u-context policies and boundary information that are transferred to the new VMM. When the system transitions away from VMM control, EFI drivers may be forced to reload as from reset.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One skilled in the art will recognize that these functional building blocks can be implemented by discrete components, application specific integrated circuits, processors executing appropriate software, and combinations thereof.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A machine-implemented method, comprising:
authenticating a pre-boot μ-hypervisor, loading the μ-hypervisor in a secure memory location, and initiating the authenticated μ-hypervisor in the secure memory location;
authenticating access control policies with the μ-hypervisor for each of multiple sets of one or more boot modules based on measurements stored in persistent memory;
configuring an access-controlled memory domain with the μ-hypervisor for each set of boot modules based on the corresponding authenticated access control policies, including configuring a separate access-controlled memory domain for a driver based on corresponding driver-specific access control policies and configuring a separate access-controlled memory domain for a terminate and stay resident (TSR) application based on corresponding TSR-specific access control policies, wherein the TSR application is callable from an application program of a post-boot run-time environment;
authenticating the boot modules;
loading the boot modules into the corresponding access-controlled memory domains, including loading the driver and the TSR application into the corresponding separate access-controlled memory domains;
initiating the authenticated boot modules within the corresponding access-controlled memory domains;
enforcing the access control policies with the μ-hypervisor during the initiating of the boot modules to prevent direct writing to each set of boot modules by any other boot module during the initiating of the boot modules, including to prevent writing to the driver and the TSR application by one another and by other ones of the boot modules during the initiating of the boot modules;
transitioning access control policies of the TSR application to the run-time environment after initiating the boot modules; and
enforcing the access control policies of the TSR application in the run-time environment to prevent writing to the TSR application by the application program.

2. The method of claim 1, further including:
accessing a firmware interface table (FIT) after a processor reset;
initiating a trusted platform module (TPM) based on the FIT to authenticate a startup authenticated code module (SACM) with respect to a measurement stored in persistent memory and to load the SACM into a secure memory location;
initiating the authenticated SACM in the secure memory location; and
authenticating, loading, and initiating the g-hypervisor from the SACM.

3. The method of claim 2, further including:
authenticating, loading, and initiating a first one of the boot modules from the SACM; and
loading, authenticating, and initiating a second one of the boot modules from the first boot module.

4. The method of claim 1, the further including:
transitioning the μ-hypervisor to a virtual machine manager (VMM) after initiation of the boot module;
initiating an operating system within a virtual machine to provide the run-time environment for the application program; and
enforcing the access control policies of the TSR application in the run-time environment with the VMM.

5. The method of claim 1, further including:
authenticating, loading, and initiating a (VMM) after initiation of the boot module;
transitioning the access control policies of the access-controlled memory domain of the TSR application to the VMM; and
initiating an operating system within a virtual machine to provide the run-time environment for the application program; and
enforcing the access control policies of the TSR application in the run-time environment with the VMM.

6. The method of claim 1, further including:
authenticating, loading, and initiating an operating system to provide the run-time environment for the application program;
transitioning the access control policies of the TSR application to the operating system; and
enforcing the access control policies of the TSR application in the run-time environment with the operating system.

7. The method of claim 1, further including:
   authenticating, loading, and initiating a first one of the boot modules from a pre-boot module; and
   authenticating, loading, and initiating a second one of the boot modules from the first boot module.

8. The method of claim 1, wherein the machine includes a processor to perform the authenticating, a management engine (ME) to communicate with an administrator system over a first communication link that is secure from the processor, and a second communication link to permit the processor and the ME to communicate with one another in a secure mode of the processor outside of an operating environment of the processor, and wherein the method further includes:
   notifying the ME over the second communication link upon an exception in authentication of a boot module;
   receiving new information from the ME over the second communication link in response to the notifying, wherein the new information includes one or more of an image and a policy;
   re-authenticating the boot module based on the new information; and
   selectively resetting the processor prior to the re-authenticating when the exception arises with respect to a boot module other than a driver.

9. A system, comprising memory and a processor configured to:
   authenticate a pre-boot μ-hypervisor, load the μ-hypervisor in a secure memory location, and initiate the authenticated μ-hypervisor in the secure memory location;
   authenticate access control policies with the μ-hypervisor for each of multiple sets of one or more boot modules based on measurements stored in persistent memory;
   configure an access-controlled memory domain with the μ-hypervisor for each set of boot modules based on corresponding authenticated access control policies, including to configure a separate access-controlled memory domain for a driver based on corresponding driver-specific access control policies and to configure a separate access-controlled memory domain for a terminate and stay resident (TSR) application based on corresponding TSR-specific access control policies, wherein the TSR application is callable from an application program of a post-boot run-time environment;
   authenticate the boot modules;
   load the boot modules into the corresponding access-controlled memory domains, including to load the driver and the TSR application into the corresponding separate access-controlled memory domains;
   initiate the authenticated boot modules within the corresponding access-controlled memory domains;
   enforce the access control policies with the μ-hypervisor during initiation of the boot modules to prevent direct writing to each set of boot modules by any other boot module during the initiation of the boot modules, including to prevent writing to the driver and the TSR application by one another and by other ones of the boot modules during the initiation of the boot modules;
   transition access control policies of the TSR application to the run-time environment after initiation of the boot modules; and
   enforce the access control policies of the TSR application in the run-time environment to prevent writing to the TSR application by the application program.

10. The system of claim 9, further including a trusted platform module (TPM), wherein the processor is further configured to:
   access a firmware interface table (FIT) after a reset of the processor;
   initiate the TPM based on the FIT to authenticate a startup authenticated code module (SACM) with respect to a measurement stored in persistent memory and load the SACM into a secure memory location;
   initiate the authenticated SACM in the secure memory location; and
   authenticate, load, and initiate the μ-hypervisor from the SACM.

11. The system of claim 10, wherein the processor is further configured to:
   authenticate, load, and initiate a first one of the boot modules from the SACM; and
   authenticate, load, and initiate a second one of the boot modules from the first boot module.

12. The system of claim 9, wherein the processor is further configured to:
   transition the μ-hypervisor to a virtual machine manager (VMM) after initiation of the boot modules;
   initiate an operating system within a virtual machine to provide the run-time environment for the application program; and
   enforce the access control policies of the TSR application in the run-time environment with the VMM.

13. The system of claim 9, wherein the processor is further configured to:
   authenticate, load, and initiate a VMM after initiation of the boot modules;
   transition the access control policies of the access-controlled memory domain of the TSR application to the VMM; and
   initiate an operating system within a virtual machine to provide the run-time environment for the application program; and
   enforce the access control policies of the TSR application in the run-time environment with the VMM.

14. The system of claim 9, wherein the processor is further configured to:
   authenticate, load, and initiate an operating system to provide the run-time environment for the application program;
   transition the access control policies of the TSR application to the operating system; and
   enforce the access control policies of the TSR application in the run-time environment with the operating system.

15. The system of claim 9, wherein the processor is further configured to:
   authenticate, load, and initiate a first one of the boot modules from a pre-boot module; and
   authenticate, load, and initiate a second one of the boot modules from the first boot module.

16. The system of claim 9, further including a management engine (ME) to communicate with an administrator system over a first communication link that is secure from the processor, and a first communication link to permit the processor and the ME to communicate with one another in a secure mode of the processor outside of an operating environment of the processor, wherein the processor is further configured to:
   notify the ME over the second communication link upon an exception in authentication of a boot module;
   receive new information from the ME over the second communication link in response to the notifying, wherein the new information includes one or more of an image and a policy;
   re-authenticate the boot module based on the new information; and selectively reset the processor prior to the re-authentication when the exception arises with respect to a boot module other than a driver.

17. A non-transitory computer readable medium encoded with a computer program, comprising instructions to cause a processor or a computer system to:
- authenticate a pre-boot μ-hypervisor, load the μ-hypervisor in a secure memory location, and initiate the authenticated μ-hypervisor in the secure memory location;
- authenticate access control policies with the μ-hypervisor for each of multiple sets of one or more boot modules based on measurements stored in persistent memory;
- configure an access-controlled memory domain with the μ-hypervisor for each of set of boot modules based on the corresponding authenticated access control policies, including to configure a separate access-controlled memory domain for a driver based on corresponding driver-specific access control policies and to configure a separate access-controlled memory domain for a terminate and stay resident (TSR) application based on corresponding TSR-specific access control policies, wherein the TSR application is callable from an application program of a post-boot run-time environment;
- authenticate the boot modules;
- load the boot modules into the corresponding access-controlled memory domains, including to load the driver and the TSR application into the corresponding separate access-controlled memory domains;
- initiate the authenticated boot modules within the corresponding access-controlled memory domains;
- enforce the access control policies with the μ-hypervisor during initiation of the boot modules to prevent direct writing to each set of boot modules by any other boot module during the initiation of the boot modules, including to prevent writing to the driver and the TSR application by one another and by other ones of the boot modules during the initiation of the boot modules;
- transition access control policies of the TSR application to the run-time environment after initiation of the boot modules; and
- enforce the access control policies of the TSR application in the run-time environment to prevent writing to the TSR application by the application program.

18. The non-transitory computer readable medium of claim 17, further including instructions to cause the processor to:
- access a firmware interface table (FIT) after a reset of the processor, wherein the FIT identifies an instruction to cause the processor to initiate a trusted platform module (TPM) from the FIT with which to authenticate a startup authenticated code module (SACM) with respect to a measurement stored in persistent memory and to load the SACM into a secure memory location; and
- initiate the authenticated SACM in the secure memory location;
- wherein the SACM includes instructions to cause the processor to authenticate, load, and initiate the μ-hypervisor.

19. The non-transitory computer readable medium of claim 18, wherein:
- the SACM further includes instructions to cause the processor to authenticate, load, and initiate a first one of the boot modules; and
- the first boot module includes instructions to cause the processor to authenticate, load, and initiate a second one of the boot modules.

20. The non-transitory computer readable medium of claim 17, further including instructions to cause the processor to:
- transition the μ-hypervisor to a virtual machine manager (VMM) after initiation of the boot modules;
- initiate an operating system within a virtual machine to provide the run-time environment for the application program; and
- enforce the access control policies of the TSR application in the run-time environment with the VMM.

21. The non-transitory computer readable medium of claim 17, further including instructions to cause the processor to:
- authenticate, load, and initiate a VMM (VMM) after initiation of the boot modules;
- transition the access control policies of the access-controlled memory domain of the TSR application to the VMM;
- initiate an operating system within a virtual machine to provide the run-time environment for the application program;
- enforce the access control policies of the TSR application in the run-time environment with the VMM.

22. The non-transitory computer readable medium of claim 17, further including instructions to cause the processor to:
- authenticate, load, and initiate an operating system to provide the run-time environment for the application program;
- transition the access control policies of the TSR application to the operating system; and
- enforce the access control policies of the TSR application with the operating system.

23. The non-transitory computer readable medium of claim 17, further including:
- a pre-boot module that includes instructions to cause the processor to authenticate, load, and initiate a first one of the boot modules;
- wherein the first boot module includes instructions to cause the processor to authenticate, load, and initiate a second one of the boot modules.

24. The non-transitory computer readable medium of claim 17, wherein the computer system includes a management engine (ME) to communicate with an administrator system over a first communication link that is secure from the processor, and a second communication link to permit the processor and the ME to communicate with one another in a secure mode of the processor outside of an operating environment of the processor, and wherein the instructions further include instructions to cause the processor to:
- notifying the engine (ME) over the first communication link upon an exception in authentication of a boot module;
- receive new information from the ME over the second communication link in response to the notifying, wherein the new information includes one or more of an image and a policy;
- re-authenticate the boot module based on the new information; and
- selectively reset the processor prior to the re-authentication when the boot module is other than a driver.

* * * * *